United States Patent
Mercier-Calvairac et al.

(10) Patent No.: US 10,338,540 B2
(45) Date of Patent: Jul. 2, 2019

(54) METHOD OF OPTIMIZED GLOBAL MANAGEMENT OF AN ENERGY NETWORK OF AN AIRCRAFT AND CORRESPONDING DEVICE

(71) Applicant: SAFRAN HELICOPTER ENGINES, Bordes (FR)

(72) Inventors: Fabien Mercier-Calvairac, Pau (FR); Antoine Drachsler, Gan (FR); Romain Thiriet, Jurancon (FR)

(73) Assignee: SAFRAN HELICOPTER ENGINES, Bordes (FR)

(*) Notice: Subject to any disclaimer, the term of this patent is extended or adjusted under 35 U.S.C. 154(b) by 33 days.

(21) Appl. No.: 15/127,381

(22) PCT Filed: Mar. 20, 2015

(86) PCT No.: PCT/FR2015/050700
§ 371 (c)(1),
(2) Date: Sep. 19, 2016

(87) PCT Pub. No.: WO2015/145044
PCT Pub. Date: Oct. 1, 2015

(65) Prior Publication Data
US 2017/0131687 A1    May 11, 2017

(30) Foreign Application Priority Data
Mar. 27, 2014 (FR) ........................................ 14 52648

(51) Int. Cl.
*G05B 13/02* (2006.01)
*H02J 4/00* (2006.01)

(52) U.S. Cl.
CPC .............. *G05B 13/024* (2013.01); *H02J 4/00* (2013.01); *B64D 2221/00* (2013.01)

(58) Field of Classification Search
CPC ........ G05B 13/024; H02J 4/00; B64D 2221/00
(Continued)

(56) References Cited

U.S. PATENT DOCUMENTS 6,496,741 B1   12/2002 Whiffen
2008/0237392 A1* 10/2008 Piasecki ............... B64C 27/26
                                                      244/6
(Continued)

FOREIGN PATENT DOCUMENTS

EP   1 420 153 A2   5/2004
EP   2 151 905 A2   2/2010
FR   2 967 133 A1   5/2012

OTHER PUBLICATIONS

Written Opinion issued in corresponding International Application No. PCT/FR2015/050700, filed Mar. 20, 2015, 8 pages [English translation].
(Continued)

*Primary Examiner* — Daniel Kessie
*Assistant Examiner* — Swarna N Chowdhuri
(74) *Attorney, Agent, or Firm* — Christensen O'Connor Johnson Kindness PLLC

(57) ABSTRACT

The invention relates to a method and to a device for optimized global management of a power network of an aircraft comprising a plurality of items of power equipment, characterized in that it comprises a module 40 for selecting at least one optimization objective (19) from a plurality of predetermined objectives, a module (42) for receiving equipment data, a module (41) for receiving aircraft data, and a module (43) for determining operating setpoints (22) of the power equipment from equipment data (21) and aircraft data (20) which is suitable for achieving at least one selected optimization objective (19).

16 Claims, 2 Drawing Sheets

Figure 1:
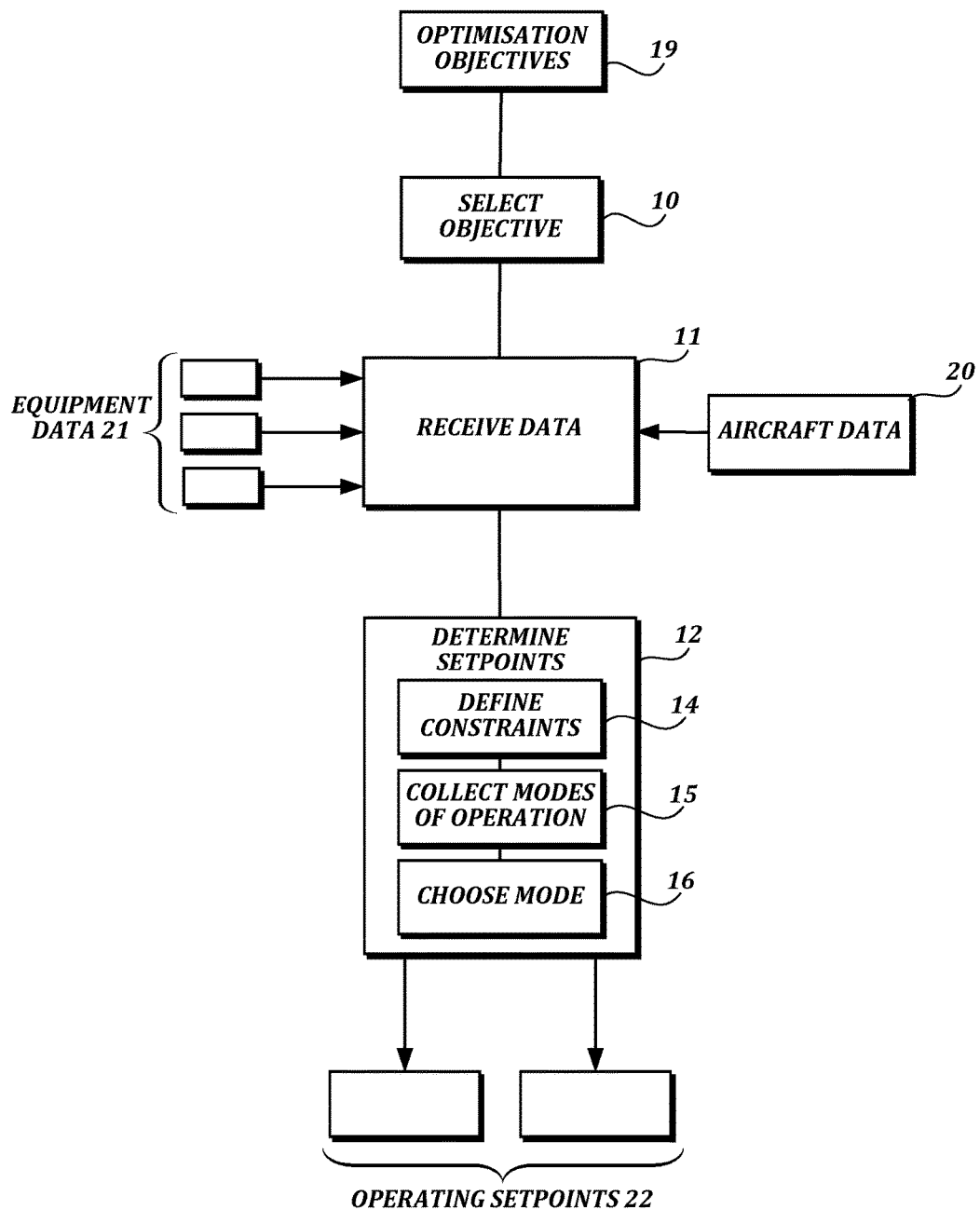

(58) Field of Classification Search
USPC .............................................................. 307/9
See application file for complete search history.

(56) References Cited

U.S. PATENT DOCUMENTS

2009/0204267 A1\* 8/2009 Sustaeta ............. G05B 13/0285
700/291
2010/0036540 A1\* 2/2010 Vian ......................... H02J 3/14
700/297

OTHER PUBLICATIONS

International Search Report dated Jun. 16, 2015, issued in corresponding International Application No. PCT/FR2015/050700, filed Mar. 20, 2015, 6 pages.

\* cited by examiner

METHOD OF OPTIMIZED GLOBAL MANAGEMENT OF AN ENERGY NETWORK OF AN AIRCRAFT AND CORRESPONDING DEVICE

1. TECHNICAL FIELD OF THE INVENTION

The invention relates to a method for optimised global management of a power network of an aircraft. The invention also relates to a device which is suitable for implementing a method according to the invention.

2. TECHNICAL BACKGROUND

As is known, an aircraft comprises a plurality of items of power equipment such as propulsion engines, non-propulsive engines, power sources, power converters and power storage devices.

All of these items of power equipment form the power network of the aircraft. There are multiple types of power, which take different forms such as electrical power, hydraulic power, pneumatic power and mechanical power.

In most aircraft, in particular twin-engine helicopters, the propulsive power of the engines is distributed in a uniform manner between the different engines to make the wear of the engines uniform.

In a three-engine helicopter, the pilot has the ability to voluntarily place an engine into standby during the non-critical phases of the flight in order to reduce the fuel consumption.

In other words, there are currently methods which are intended to optimise either the fuel consumption of the engines or the service life of the engines.

That said, these areas for optimisation are limited to some specific types of aircraft.

Furthermore, there are no methods which make it possible to optimise other parameters, such as the acoustic comfort inside the aircraft, the stealthiness of the aircraft, the responsiveness of the aircraft, the pollutant emissions of the aircraft, and generally any parameter which characterises the aircraft.

Furthermore, there are also no methods which allow optimised joint management of the propulsive and non-propulsive power of an aircraft. There are also no methods for optimising power between the different heat engines, electric motors or other engines of a propulsion system of an aircraft.

The inventors have thus sought to provide a method for optimised global management of a power network of an aircraft.

3. AIMS OF THE INVENTION

The invention aims to propose a method for optimised global management of a power network of an aircraft.

The invention aims in particular to provide such a method which can be adapted to any type of aircraft, in particular to helicopters.

The invention also aims to provide a device for optimised global management of a power network of an aircraft.

4. SUMMARY OF THE INVENTION

For this purpose, the invention relates to a method for optimised global management of a power network of an aircraft, comprising a plurality of items of power equipment, characterised in that it comprises:

- a step of selecting at least one optimisation objective from a plurality of predetermined objectives,
- a step of receiving information which is representative of the operations of said items of power equipment, which is referred to as equipment data,
- a step of receiving information which is representative of the operation of said aircraft, which is referred to as aircraft data,
- a step of determining operating setpoints of said items of power equipment from said equipment data and said aircraft data which are suitable for achieving at least one selected optimisation objective.

A method according to the invention thus makes it possible to provide the different items of power equipment of a power network of an aircraft with specific operating setpoints which are intended to meet an optimisation objective which is preselected from a plurality of predetermined objectives. The determination of the operating setpoints is dependent on information which is representative of the operation of the equipment and of the aircraft. This makes it possible to ensure that the setpoints do not jeopardise the safety of the flight. Furthermore, this makes it possible to adapt the setpoints to the operating environment of the aircraft at any given moment.

In other words, a method according to the invention makes it possible to optimise, under constraints, one or more parameters which are selected, for example, by the pilot of the aircraft. The method thus makes it possible to distribute the power of the aircraft in a specific (uniform or non-uniform) manner between the different items of equipment in order to achieve one or more optimisation objectives.

Advantageously and according to the invention, said step of determining setpoints comprises:

- a sub-step of defining constraints to be respected by said items of power equipment which are dependent on said aircraft data and on each selected objective,
- a sub-step of collecting, for each item of power equipment, possible modes of operation which are dependent on said constraints and on said equipment data,
- a sub-step of choosing, for each item of power equipment, a mode of operation from said possible modes of operation.

According to this aspect of the invention, the operating setpoints of the power equipment are determined as a result of three subsequent steps.

The first step (said sub-step of defining constraints) is a step in which the environment of the aircraft, which is characterised by the aircraft data and the intended objectives, imposes specific constraints on the equipment of the network. For example, if the aircraft is in a critical flight phase, some specific constraints are imposed on the propulsion engines, such as the obligation to operate at a rated speed.

The second step (said sub-step of collecting) is a step in which a restricted list of possible modes of operation is established from the constraints imposed in the preceding step and from the data which is representative of the status of the equipment. For example, if a propulsion engine has a temperature which is close to the limit temperature thereof, some modes of operation cannot be preselected.

The third step (said sub-step of choosing) is a step in which a mode is chosen for each item of equipment from the restricted list of the different modes of operation. This mode is associated with setpoints for each item of equipment. Said setpoints can be of different types. They can relate for example to a level of power, torque or speed of a propulsion engine. They can also relate to a temperature setpoint of an engine. They can also relate to a setpoint for achieving a specific engine regime. For example, in the case of a turboshaft engine of a helicopter, the regime to be achieved can be the regime known under the abbreviation MTOP (maximum take-off power) or a specific standby regime and generally, any engine regime which is suitable for achieving selected optimisation objectives.

Advantageously, a method according to the invention further comprises a step of calculating a value which is representative of the benefit of each optimisation objective which is selected with respect to a default objective.

This step makes it possible to provide for example the pilot with an indication of the effect of the intended optimisation objective with respect to a default objective.

Advantageously and according to this variant, said default objective aims to distribute in an optimal manner, according to requirements, propulsive power between said items of power equipment.

The default objective is the conventional objective intended by the methods from the prior art. The invention thus makes it possible to provide an indication of the advantage obtained by the mode of operation which is selected with respect to the optimal distribution of power between the different propulsion engines.

Advantageously and according to the invention, each optimisation objective is intended for a predetermined period of time.

According to this variant, the intended optimisation objectives are intended for a predetermined period of time.

Advantageously and according to this variant of the invention, said predetermined period of time is selected from the group comprising a point in time, a predetermined interval of time during a flight of the aircraft, a period corresponding to an entire flight of the aircraft, for a duration corresponding to full utilisation of the aircraft.

This makes it possible to select the duration of the intended optimisation. For example, it is possible to seek an instantaneous optimisation of the performance of the power network. It is also possible to aim for a global optimisation over the entire mission of the aircraft. It is also possible to aim for a global optimisation over the entire service life of the aircraft.

In the case of a global optimisation over a mission or over the entire service life of the aircraft, the algorithms implemented by the method are advantageously integrated into tools for mission preparation or for fleet management. Said tools are for example installed in the client facilities of aircraft operators, aircraft integrators or are even accessible via an internet portal for engine manufacturer services.

Advantageously and according to the invention, said plurality of predetermined objectives comprises at least the following objectives:
  an objective of minimising fuel consumption by said equipment of said power network,
  an objective of optimally distributing, according to requirements, propulsive power between items of propulsive equipment of said power network,
  an objective of maximising the transitional performance of said propulsive equipment of said power network,
  an objective of maximising the performance of the aircraft during short-duration phases of the take-off phase type,
  an objective of improving the precision of the operations for monitoring the health of the equipment,
  an objective of minimising the maintenance costs of the equipment,
  an objective of altering the maintenance operations of the equipment,
  an objective of minimising the external noise generated by the aircraft,
  an objective of minimising the noise inside the aircraft,
  an objective of minimising the surface infrared of the aircraft,
  an objective of minimising pollutant emissions,
  an objective of minimising the vibration levels.

A method according to the invention thus makes it possible to optimise a specific number of parameters, including parameters relating to fuel consumption, parameters relating to the operating costs of the aircraft and parameters relating to the emissions of the aircraft.

Advantageously and according to the invention, said plurality of items of power equipment comprises at least the following items of equipment:
  propulsion engines of the aircraft,
  non-propulsive engines,
  power sources,
  power converters.

The invention also relates to a device for optimised global management of a power network of an aircraft, comprising a plurality of items of power equipment, characterised in that it comprises:
  a module for selecting at least one optimisation objective from a plurality of predetermined objectives,
  a module for receiving information which is representative of the operations of said items of power equipment, which is referred to as equipment data,
  a module for receiving information which is representative of the operation of said aircraft, which is referred to as aircraft data,
  a module for determining operating setpoints of said power equipment from said equipment data and said aircraft data which are suitable for achieving at least one selected optimisation objective.

Throughout the text, the term module denotes a software element, a sub-assembly of a software program, which can be compiled separately, either for separate use or to be linked to other modules of a program, or a hardware element, or a combination of a hardware element and a software subprogram. A hardware element of this type can comprise an application-specific integrated circuit (better known by the abbreviation ASIC) or a programmable software circuit or any equivalent hardware. In a general manner, a module is thus a (software and/or hardware) element which makes it possible to provide a function.

The selection module of the device according to the invention advantageously implements the selection step from the method according to the invention, and the selection step from the method according to the invention is advantageously implemented by the selection module of the device according to the invention.

Likewise, the modules for receiving the aircraft data and the equipment data advantageously implement the steps of receiving aircraft and equipment data from the method according to the invention, and said steps are advantageously implemented by the receiving modules of the device according to the invention.

Likewise, the module for determining setpoints advantageously implements the step of determining setpoints from a method according to the invention, and the step of determining setpoints is advantageously implemented by the determination module of the device according to the invention.

Advantageously, a device according to the invention comprises a human-machine interface which is suitable for interacting with said selection module in such a way that an operator can select an optimisation objective by means of the human-machine interface.

Advantageously and according to the invention, said module for determining setpoints comprises:
- a sub-module for defining constraints to be respected by said items of power equipment which are dependent on said aircraft data and each selected objective,
- a sub-module for collecting, for each item of power equipment, possible modes of operation which are dependent on said constraints and said equipment data,
- a sub-module for choosing, for each item of power equipment, a mode of operation from said possible modes of operation.

Advantageously, a device according to the invention further comprises a module for calculating a value which is representative of the benefit of each optimisation objective which is selected with respect to a default objective.

Advantageously and according to the invention, said human-machine interface is configured to provide an operator with information which is representative of said constraints and/or said possible modes of operation and/or said chosen mode of operation and/or said determined setpoints and/or said value which is representative of the benefit of each objective.

The human-machine interface thus allows an operator, such as a pilot of the aircraft, to select one or more optimisation objectives which are then taken into account by the module for determining setpoints, in conjunction with any constraints imposed by the aircraft, in order to define modes of operation of the different items of power equipment which are suitable for achieving these objectives.

Advantageously, said human-machine interface also makes it possible to provide the operator with information which is representative of the modes of operation of the equipment.

Said information is for example displayed on dedicated sections of the instrument panels via the aircraft avionics. Said information is for example provided in the form of synthetic indicators which allow the operator to verify that the propulsion engines are operating within the validated rated limits thereof, to verify that the equipment associated with the propulsion engines such as electric motors, power storage devices and control electronics are also operating within the validated rated limits thereof (in particular thermal limits), and to have access to information about the selected optimisations and the associated benefit.

The invention also relates to a method for optimised global management of a power network of an aircraft and to a corresponding device characterised in combination by some or all of the features described previously or hereinafter.

5. LIST OF THE DRAWINGS

Figure 2:
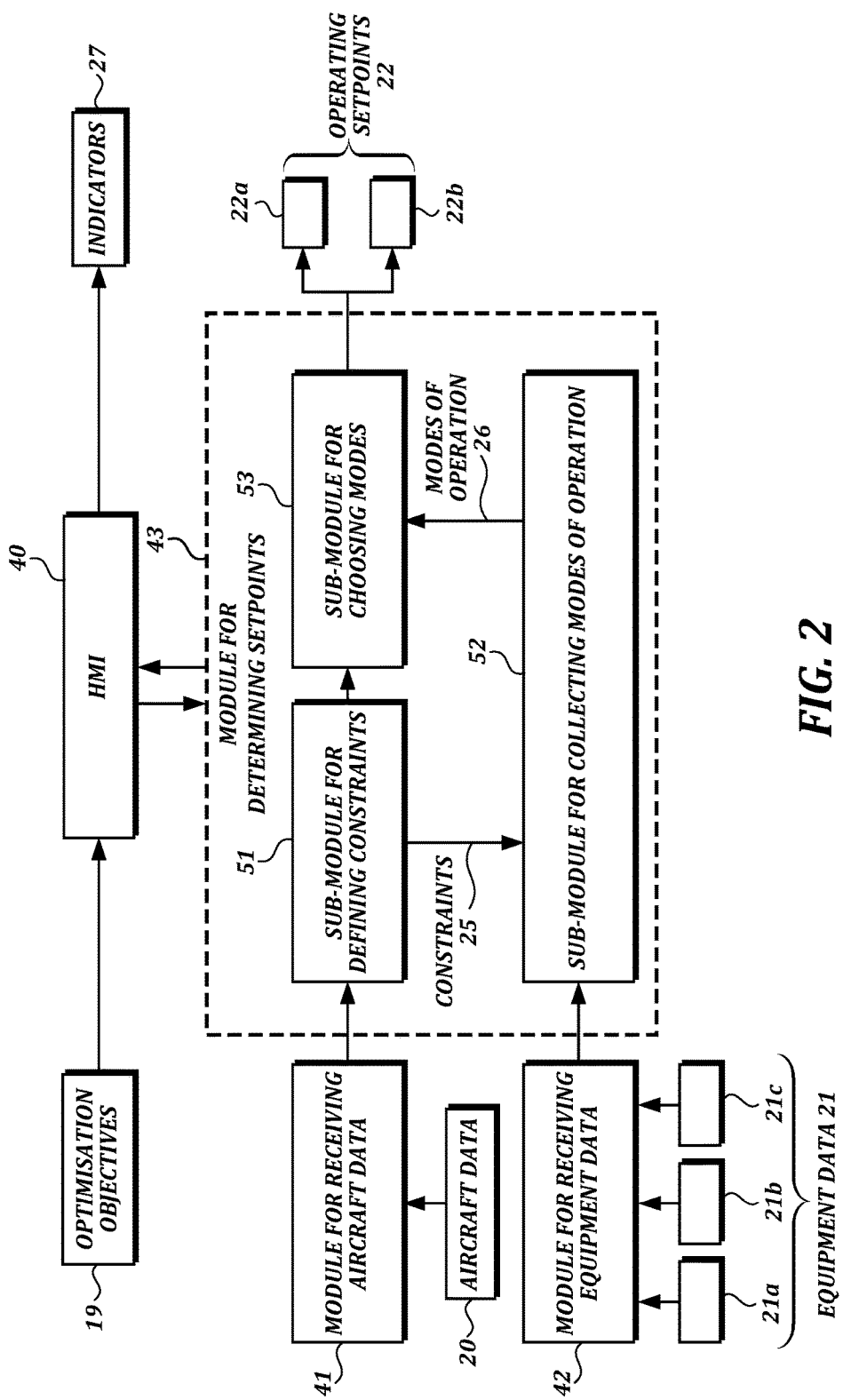

Other aims, features and advantages of the invention will become apparent upon reading the following description, which is provided purely on a non-limiting basis and relates to the accompanying drawings, in which:

FIG. 1 is a schematic view of a method for optimised global management of a power network of an aircraft according to one embodiment of the invention, FIG. 2 is a schematic view of a device for optimised global management of a power network of an aircraft according to one embodiment of the invention.

6. DETAILED DESCRIPTION OF AN EMBODIMENT OF THE INVENTION

A method according to the invention comprises a step 10 of selecting at least one optimisation objective from a plurality of predetermined objectives.

Said method also comprises a step 11 of receiving equipment data 21 which is representative of the operations of the items of power equipment and aircraft data 20 which is representative of the operation of the aircraft.

Lastly, it comprises a step 12 of determining operating setpoints 22 of the power equipment which are suitable for achieving the selected optimisation objectives.

A method according to the invention is advantageously implemented by a device according to the invention which comprises, as shown in FIG. 2, a module 40 for selecting at least one optimisation objective 19 from a plurality of predetermined objectives, a module 41 for receiving aircraft data 20, a module 42 for receiving equipment data 21, and a module 43 for determining operating setpoints 22 of the power equipment.

In the rest of the detailed description, the aircraft in question is a helicopter comprising at least two turboshaft engines. Each turboshaft engine comprises a gas generator having a free turbine or having a turbine which is rigidly connected to an output shaft which is set into rotation by the gas generator. The output shaft of each free turbine or connected turbine is suitable for setting into motion a power transmission gearbox (hereafter referred to by the abbreviation PTG) which in turn drives the rotor of the helicopter which is equipped for example with blades having a variable pitch or other electromechanical or hydraulic members. The power network of the helicopter comprises, in addition to the turboshaft engines, power storage devices, converters and non-propulsive engines.

Of course, the embodiments described hereafter in connection with such a helicopter can be adapted, mutatis mutandis, to other types of aircraft.

The module for selecting an optimisation objective is preferably a human-machine interface which allows an operator—such as a pilot, or an engineer on the ground who is in charge of the flight of the aircraft, etc.—to select one or more optimisation objectives. For example, according to one embodiment, a digital switch is used to select an objective from a plurality of proposed objectives. This interface also preferably comprises a screen for displaying information 27 in the form of synthetic indicators allowing the operator to take note of the setpoints determined by the determination module 43. This interface also preferably makes it possible to provide information about the operating status of the different items of power equipment of the power network of the aircraft.

According to the embodiment in the drawings, the equipment data 21 comprises data 21a originating from the heat engines of the power network of the aircraft, data 21b from the electric, hydraulic, pneumatic and pyrotechnic machines of the power network of the aircraft and data 21c from the power storage devices.

The setpoints 22 determined by the module 43 comprise setpoints 22a for the heat engines and setpoints 22b for the non-heat engines.

Furthermore, the module 43 for determining the setpoints 22a, 22b preferably comprises a sub-module 51 for defining constraints to be respected by the power equipment of the network of the aircraft which are dependent on the aircraft data 20 and each selected objective 19. Said sub-module 51 implements the step 14 of defining constraints of a method according to the invention.

It further comprises a sub-module 52 for collecting, for each item of power equipment, possible modes of operation which are dependent on the constraints 25 provided by the sub-module 43 and the equipment data 21a, 21b, 21c. Said sub-module 52 implements the step 15 of collecting possible modes of operation of a method according to the invention.

Lastly, it comprises a sub-module 53 for choosing, for each item of power equipment, a mode of operation from the list 26 of the possible modes of operation transmitted by the sub-module 52. Said sub-module 53 implements the step 16 of choosing a mode of operation of a method according to the invention.

According to different variants, some modules can be combined into a single module in such a way that the algorithms for determining constraints, for collecting possible modes of operation and for choosing can be combined on the engine side or on the aircraft side. Different architectures are therefore possible.

Furthermore, the device according to the invention comprises a module for calculating a value which is representative of the benefit of the objective 19 which is selected with respect to a default objective of uniform distribution of the energy. This calculation module is preferably the sub-module 53 which recognises the selected mode of operation.

According to one embodiment of the invention, the plurality of selectable predetermined objectives comprises objectives relating to fuel consumption, objectives relating to the operating costs of the aircraft and objectives relating to the emissions of the aircraft.

According to one embodiment of the invention, the objectives relating to fuel consumption comprise the following objectives 19: (i) an objective of minimising the fuel consumption by the equipment of said power network; (ii) an objective of optimally distributing the propulsive power between items of propulsive equipment of the power network; (iii) an objective of maximising the transitional performance of the propulsive equipment of the power network, in particular during short-duration phases of the take-off phase type.

(i) Objective of Minimising Fuel Consumption

When selecting an objective of minimising the fuel consumption by the equipment of the network, the aircraft data 20 and the equipment data 21 received by the modules 41, 42 are as follows:
  provided profile of the mission (duration, distance, flight altitudes/levels),
  flight conditions (temperature, pressure, speeds),
  mass of the aircraft in real time,
  height from ground,
  level of power take-off (P3, electrical, mechanical, thermal),
  engine parameters for regulation,
  parameters for monitoring health (state of charge of the storage devices, temperatures of the storage devices, temperatures of the starter motors, etc.).

The module 43 for determining output setpoints is configured to provide the following setpoints:
  setpoint for distributing power between the engines,
  speed setpoint in rpm of the engine or engines (primary shaft and/or secondary shaft) to be placed in standby according to a predetermined standby regime. A standby regime of this type is for example a standby regime described in the patent application FR1363316 filed in the name of the applicant,
  operating setpoint of the equipment of the non-propulsive system such as a setpoint for powering an electric power-assistance motor in the standby mode of the turboshaft engines.

Furthermore, the human-machine interface 40 is configured to provide the pilot with the following information:
  number of heat engines in operation,
  benefit of the management mode selected with respect to the symmetrical management mode corresponding to the default objective,
  a recommendation for the flight speed and the altitude,
  a recommendation for the distribution of the pneumatic and electrical power take-off between the different engines.

The mode of operation designated by the determination module 43 makes it possible for example to provide the ideal flight speed in order to reduce consumption and/or provide the ideal flight altitude in order to reduce consumption (e.g. descend slightly so that an engine can be placed in standby, climb slightly in order to increase the thermal level of use of the engine or engines).

(ii) Objective of Maximising the Transitional Performance of the Propulsion System When selecting an objective of maximising the transitional performance in order to improve the responsiveness of the aircraft, for example in order to improve the performance in terms of avoiding obstacles, the aircraft data 20 and the equipment data 21 received by the modules 41, 42 are as follows:
  flight conditions (temperature, pressure),
  level of power-take off (P3, electrical, mechanical, thermal),
  internal engine parameters for regulation,
  parameters for monitoring health (state of charge of the storage devices, temperatures of the storage devices, temperatures of the starter motors, etc.).

The module 43 for determining output setpoints is configured to provide the following setpoints:
  setpoint for distributing propulsive and non-propulsive power between the engines,
  speed setpoint in rpm of the engine or engines (primary and/or secondary shaft) in standby,
  operating setpoint of the equipment of the non-propulsive system (management of the sub-systems such as the electrical and pneumatic power-take off).

Furthermore, the human-machine interface 40 is configured to provide the pilot with the following information:
  pilot information (number of engines in operation),
  benefit of the management mode with respect to the symmetrical management mode.

This makes it possible for example to ensure transitional shedding of the mechanical power-take off on the gas generator due to the electrical power-take off on one or more turbine engines. This allows a use, during this period, of the electrical storage device to ensure the continuity of the supply, or the transitional shedding of the pneumatic power-take off on one or more turbine engines. This makes it possible to eliminate, during this period, the comfort functions powered thereby. This also makes it possible to provide assistance to the deceleration of the gas generator in order to minimise the overspeeds.

In the case of a twin-engine helicopter, the setpoints can be intended to provide an injection of mechanical power from the storage device to the gas generator of the engines. In the case of a three-engine helicopter comprising two large engines and one small engine, these setpoints can be intended to provide an injection of mechanical power from the small engine (and/or from a storage device) to the gas generators of the large engines. Said injection can also be an injection of power from the gas generators of the large engines to the free turbine of the small engine or to a storage device.

(iii) Objective of Maximising the Performance of the Aircraft During Short-Duration Phases of the Take-Off Phase Type When selecting an objective of maximising the transitional performance of the propulsive equipment (such as during a take-off phase), the aircraft data 20 and the equipment data 21 received by the modules 41, 42 are as follows:
flight conditions (temperature, pressure),
mass of the aircraft in real time,
height from ground,
level of power-take off (P3, electrical, mechanical, thermal),
internal parameters of the engines for regulation,
parameters for monitoring health (state of charge of the storage devices, temperatures of the storage devices, temperatures of the starter motors, etc.).

The module 43 for determining output setpoints is configured to provide the following setpoints:
setpoint for distributing propulsive and non-propulsive power between the engines,
authorisation (release) by the engine control of specific AEO (all engines operative) or OEI (one engine inoperative) regimes,
operating setpoint of the equipment of the non-propulsive system.

Furthermore, the human-machine interface 40 is configured to provide the pilot with the following information:
number of engines in operation and regimes authorised for each heat engine,
benefit of the management mode with respect to the symmetrical management mode.

This objective can for example lead to the injection of power for 5 to 30 seconds to the gas generator via an electric motor powered by a storage device or an APU, or directly via one of the heat engines to the others. It can also lead to the injection of power for 5 to 30 seconds to the free turbine shaft via an electric motor powered by a storage device or an APU, or directly via one of the heat engines to the others. It also makes it possible to define different regime structures for each engine which will be activated according to the type of mission of the helicopter.

Other types of objectives relating to the optimisation of fuel consumption are possible. For example, it is possible to provide an objective of improving the precision of the operations for monitoring the health of the engines. Such an objective is intended to be able to modify the distribution of the power between engines in order to improve the precision of the Engine Health Monitoring by carrying out this operation at a sufficiently high speed on the engine in question and by eliminating the factors of imprecision such as the non-propulsive take-off of the air bleed type or take-off of electrical/mechanical power which can be switched over to another engine. The Engine Health Monitoring operations can also be enhanced in terms of monitoring vibrational health by using modes of operation which make it possible to de-align the engines in order to place said engines in specific regimes or carry out scans in regimes.

According to one embodiment of the invention, the objectives relating to minimising the operating costs comprise:
(iv) an objective of minimising the operating costs.

(iv) Objective of Minimising the Operating Costs

When selecting an objective of minimising the operating costs of the aircraft, the aircraft data 20 and the equipment data 21 received by the modules 41, 42 are as follows:
flight conditions (temperature, pressure, speeds),
mass of the aircraft in real time,
number of passengers or payload,
internal parameters of the engines for regulation,
parameters for monitoring health (state of charge of the storage devices, temperatures of the storage devices, temperatures of the starter motors, etc.),
damage counter,
cycle counter for low-cycle fatigue.

The module 43 for determining output setpoints is configured to provide the following setpoints:
setpoint for distributing power between the engines,
speed setpoint in rpm of the engine or engines (primary shaft and/or secondary shaft) in standby,
operating setpoint of the equipment of the non-propulsive system (setpoint for powering an electric motor in turning mode).

Furthermore, the human-machine interface 40 is configured to provide the pilot with the following information:
benefit of the management mode with respect to the symmetrical management mode,
a recommendation for the flight speed and the altitude.

This objective can for example be intended to minimise the number of cycles or to not exceed specific internal temperatures of the turbine engines.

Other types of objectives relating to minimising costs are possible. For example, it is possible to seek to minimise the direct operating costs of the engines or of the aircraft (a combination of the maintenance costs and the cost of the fuel). It is also possible to seek to alter the engine or helicopter maintenance operations: the use of dissymmetric modes of operation between engines causes damage and different consumptions in cycles between the engines installed in the same aircraft. If it is desired to delay the maintenance operations on one of the engines (for example which is close to one of the limitations which requires a maintenance operation), it is possible to conceive of a logic which keeps this engine in reserve in favour of the engines having more leeway in terms of maintenance operations. A similar mode can be proposed for keeping the PTG of a helicopter in reserve, which can age differently depending on the level of asymmetry between the different inputs corresponding to the different engines.

The invention can also provide logics for optimising the emissions. In particular, modes of asymmetric operation provide one or more degrees of freedom (via the distribution of power between engines) to minimise various signatures of the aircraft and the engines thereof.

Thus, according to one embodiment of the invention, an objective of minimising the external noise is provided. On the basis of the acoustic characteristics of the different engine and aircraft sources and of the knowledge of a cartography of the surrounding land, it is possible to determine at any moment the distribution of power between engines that minimises the perceived noise at a given point.

According to one embodiment of the invention, an objective of minimising the internal noise is provided. On the basis of the acoustic characteristics of the different engine and aircraft sources and of the transfer characteristic of the aircraft, it is possible to determine the distribution of power between engines that minimises the perceived noise inside the aircraft.

According to one embodiment of the invention, an objective of minimising the surface infrared (SIR) is provided. By means of engine performance models and characteristic curves of the emissions, it is possible to construct an estimator of SIR which can be minimised by adjusting the distribution of power between engines in each flight phase.

According to one embodiment of the invention, an objective of minimising the pollutant emissions (CO2, CO, NOx, unburned fuel, etc.) is provided. By means of the models of pollutant engine emissions, it is possible to evaluate the instantaneous pollutant emissions which can be minimised by adjusting the distribution of power between engines in each flight phase. If a system were introduced for taxing pollutant emissions, an economic model could be developed to evaluate the amount of taxes due by the operator when carrying out the mission thereof.

According to one embodiment of the invention, an objective of minimising the vibration levels is provided. On the basis of the vibration characteristics of the different sources of engine and aircraft excitation and the transfer characteristic of the aircraft, it is possible to determine the distribution of power between engines that minimises the vibration level at a given point on the aircraft.

The invention is not limited only to the described embodiments. In particular, other optimisation objectives and associated logics can be integrated in a device and a method according to the invention.

What is claimed is:

1. A method for optimised global management of a power network of an aircraft comprising a plurality of items of power equipment, the method comprising:
   a step of selecting at least one optimisation objective from a plurality of predetermined objectives,
   a step of receiving, by circuitry programmed to receive equipment data, information which is representative of the operations of said items of power equipment, which is referred to as equipment data, and of receiving, by circuitry programmed to receive aircraft data, information which is representative of the operation of said aircraft, which is referred to as aircraft data, and
   a step of determining operating setpoints of said power equipment from said equipment data and said aircraft data which are suitable for achieving at least one selected optimisation objective; and
   a step of applying said determined operating setpoints to said items of power equipment to modify performance of said items of power equipment;
   wherein said plurality of predetermined objectives comprises at least the following objectives:
      an objective of minimising fuel consumption by said equipment of said power network,
      an objective of optimally distributing, according to requirements, propulsive power between items of propulsive equipment of said power network,
      an objective of maximising transitional performance of said propulsive equipment of said power network,
      an objective of maximising performance of the aircraft during short-duration phases of a take-off phase type,
      an objective of improving precision of operations for monitoring health of the equipment,
      an objective of minimising maintenance costs of the equipment,
      an objective of altering maintenance operations of the equipment,
      an objective of minimising external noise generated by the aircraft,
      an objective of minimising noise inside the aircraft,
      an objective of minimising surface infrared of the aircraft,
      an objective of minimising pollutant emissions, and
      an objective of minimising vibration levels.

2. The method according to claim 1, wherein said step of determining setpoints comprises:
   a sub-step of defining constraints to be respected by said items of power equipment which are dependent on said aircraft data and each selected objective,
   a sub-step of collecting, for each item of power equipment, possible modes of operation which are dependent on said constraints and said equipment data, and
   a sub-step of choosing, for each item of power equipment, a mode of operation from said possible modes of operation.

3. The method according to claim 1 comprising a step of presenting an indication of an effect of each optimisation objective which is selected with respect to a default objective.

4. The method according to claim 3, wherein said default objective aims to distribute in an optimal manner, according to requirements, propulsive power between said items of power equipment.

5. The method according to claim 1, wherein each optimisation objective is intended for a predetermined period of time.

6. The method according to claim 5, wherein said predetermined period of time is a point in time, a predetermined interval of time during a flight of the aircraft, a period corresponding to an entire flight of the aircraft, or a duration corresponding to full utilisation of the aircraft.

7. The method according to claim 1, wherein said plurality of items of power equipment comprises at least the following items of equipment:
   propulsion engines of the aircraft,
   non-propulsive engines,
   power sources, and
   power converters.

8. A device for optimised global management of a power network of an aircraft comprising a plurality of items of power equipment, the device comprising:
   hardware circuitry programmed to select at least one optimisation objective from a plurality of predetermined objectives,
   hardware circuitry programmed to receive information which is representative of the operations of said items of power equipment, which is referred to as equipment data,
   hardware circuitry programmed to receive information which is representative of the operation of said aircraft, which is referred to as aircraft data,
   hardware circuitry programmed to determine operating setpoints of said items of power equipment from said equipment data and said aircraft data which are suitable for achieving at least one selected optimisation objective, and
   hardware circuitry programmed to apply said determined operating setpoints to said items of power equipment to modify performance of said items of power equipment;
   wherein said plurality of predetermined objectives comprises at least the following objectives:
      an objective of minimising fuel consumption by said equipment of said power network,
      an objective of optimally distributing, according to requirements, propulsive power between items of propulsive equipment of said power network,
      an objective of maximising transitional performance of said propulsive equipment of said power network, an objective of maximising performance of the aircraft during short-duration phases of a take-off phase type, an objective of improving precision of operations for monitoring health of the equipment, an objective of minimising maintenance costs of the equipment, an objective of altering maintenance operations of the equipment, an objective of minimising external noise generated by the aircraft, an objective of minimising noise inside the aircraft, an objective of minimising surface infrared of the aircraft, an objective of minimising pollutant emissions, and an objective of minimising vibration levels.

9. The device according to claim 8, further comprising a human-machine interface which is suitable for interacting with said selection module in such a way that an operator can select an optimisation objective by means of the human-machine interface.

10. The device according to claim 8, wherein said hardware circuitry programmed to determine setpoints comprises:

a sub-module for defining constraints to be respected by said power equipment which are dependent on said aircraft data and each selected objective, a sub-module for collecting, for each item of power equipment, possible modes of operation which are dependent on said constraints and said equipment data, and a sub-module for choosing, for each item of power equipment, a mode of operation from said possible modes of operation.

11. The device according to claim 8, further comprising a human-machine interface which is suitable for presenting an indication of an effect of each optimisation objective which is selected with respect to a default objective.

12. The device according to claim 9, wherein said hardware circuitry programmed to determine setpoints comprises:

a sub-module for defining constraints to be respected by said power equipment which are dependent on said aircraft data and each selected objective, a sub-module for collecting, for each item of power equipment, possible modes of operation which are dependent on said constraints and said equipment data, and a sub-module for choosing, for each item of power equipment, a mode of operation from said possible modes of operation, and wherein said human-machine interface is configured to provide an operator with information which is representative of said constraints and/or said possible modes of operation and/or said chosen mode of operation and/or said determined setpoints and/or an effect of each optimisation objective which is selected with respect to a default objective.

13. The method according to claim 1, wherein said determined setpoints comprise a setpoint for distributing power between engines, an engine speed setpoint, and an operating setpoint of equipment in a non-propulsive system.

14. The method according to claim 13, wherein said at least one selected optimisation objective comprises the objective of minimising fuel consumption by said equipment of said power network.

15. The method according to claim 1, wherein said at least one selected optimisation objective comprises the objective of maximising transitional performance of said propulsive equipment of said power network, and wherein said determined setpoints comprise a setpoint for distributing propulsive and non-propulsive power between engines, an engine speed setpoint, and an operating setpoint of equipment in a non-propulsive system.

16. The method according to claim 1, wherein said at least one selected optimisation objective comprises the objective of maximising performance of the aircraft during short-duration phases of the take-off phase type, and wherein said determined setpoints comprise a setpoint for distributing propulsive and non-propulsive power between engines, an authorization of AEO (all engines operative) or OEI (one engine inoperative) regimes, and an operating setpoint of equipment in a non-propulsive system.

* * * * *